Aug. 29, 1967  J. M. ROETHLISBERGER ETAL  3,338,348
BRAKE PEDAL HEIGHT ADJUSTING AND RATIO CHANGING MECHANISM
Filed Sept. 15, 1964  2 Sheets-Sheet 1
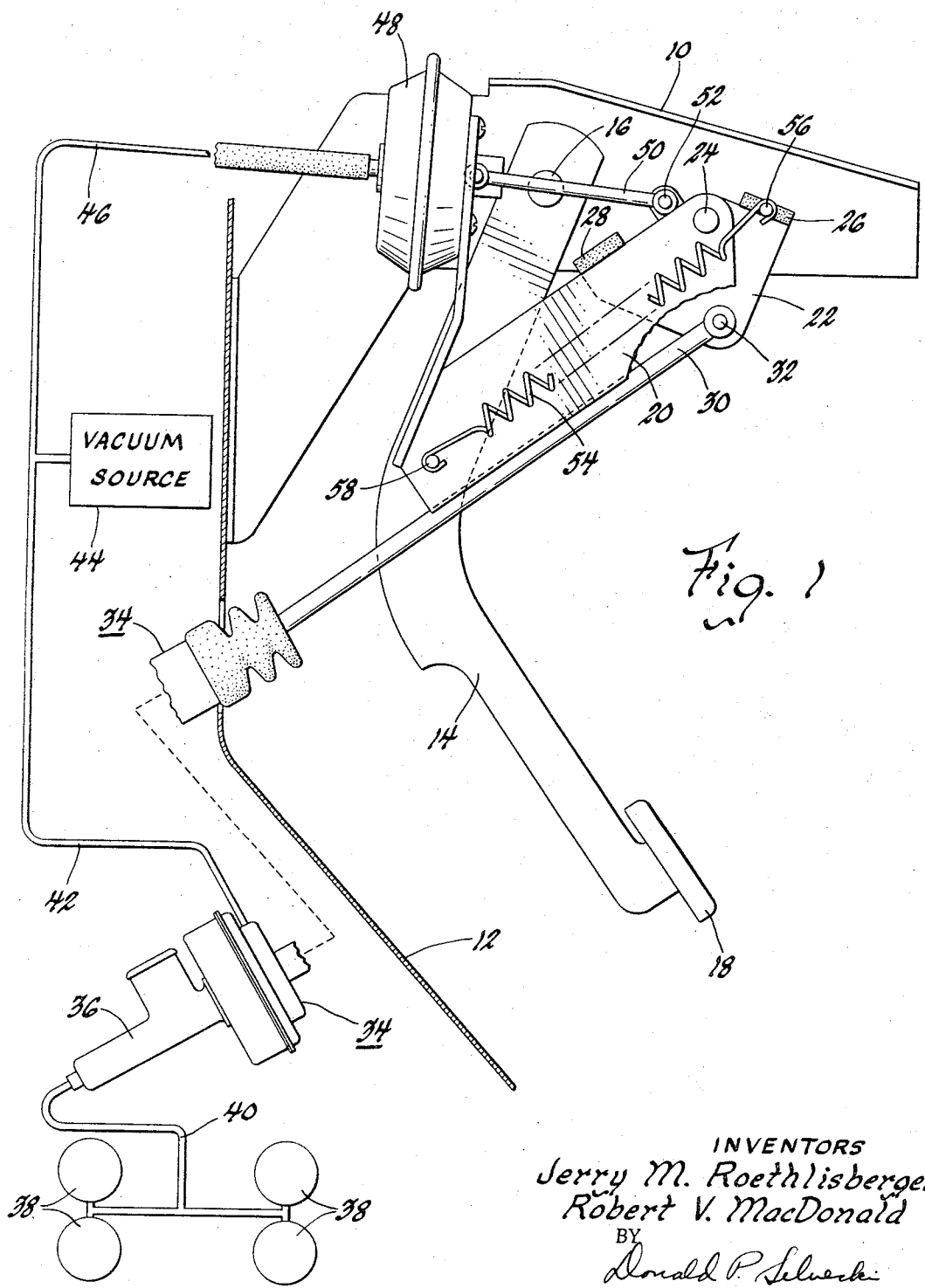
INVENTORS
Jerry M. Roethlisberger
Robert V. MacDonald
BY
Donald P. Silverski
THEIR ATTORNEY

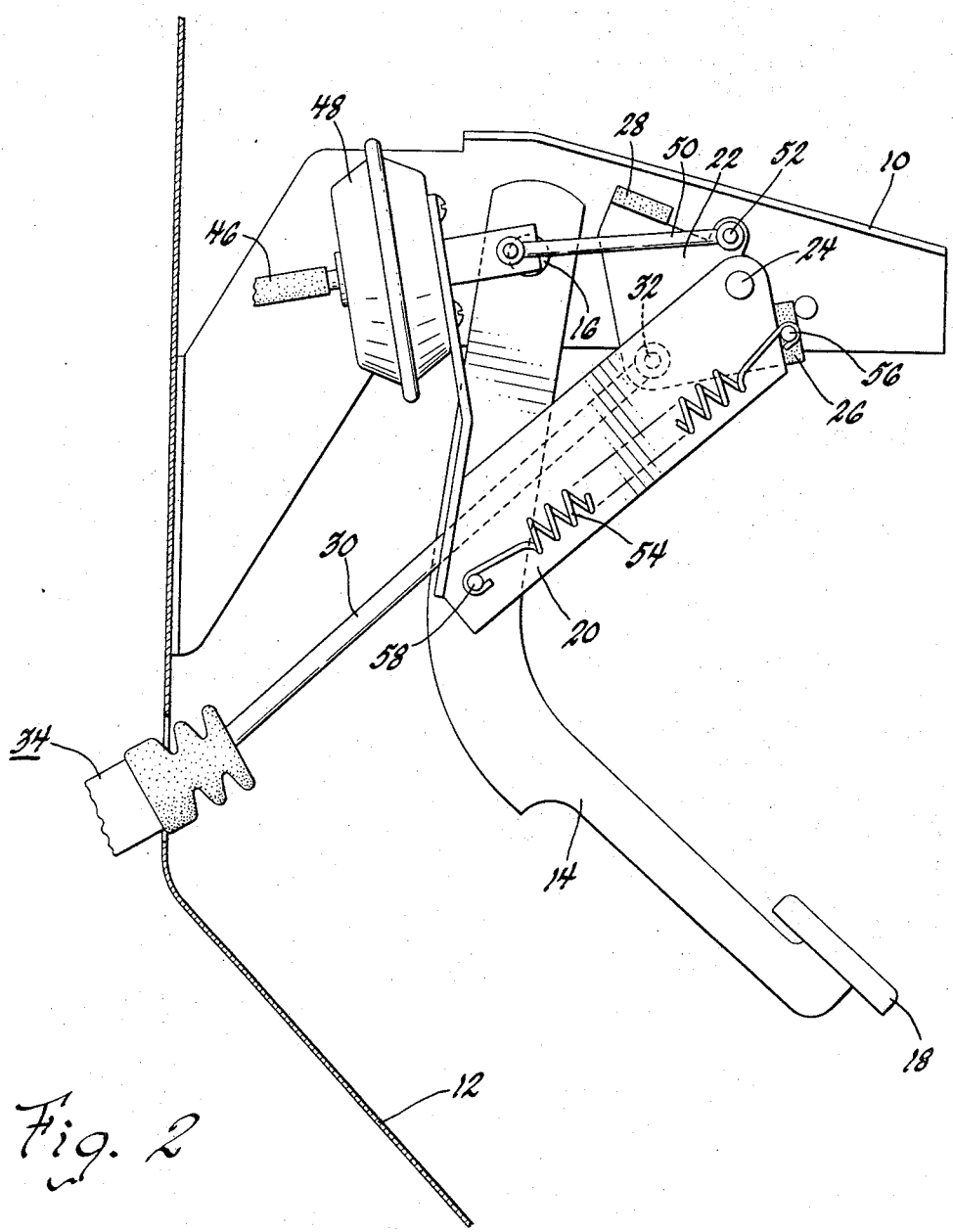

United States Patent Office 3,338,348
Patented Aug. 29, 1967

3,338,348
BRAKE PEDAL HEIGHT ADJUSTING AND
RATIO CHANGING MECHANISM
Jerry M. Roethlisberger and Robert V. MacDonald,
Saginaw, Mich., assignors to General Motors Corporation, Detroit, Mich., a corporation of Delaware
Filed Sept. 15, 1964, Ser. No. 396,608
6 Claims. (Cl. 188—152)

This invention relates to vehicle braking systems and more particularly to a ratio changing mechanism designed to change the mechanical advantage available to a vehicle operator for operating the vehicle braking system.

It is common in the design of vehicle braking systems having a power assist means to mount the brake pedal in close proximity to the floor boards of a vehicle. Braking systems of the type described usually have the capability of being manually energizable by the same brake pedal when the power assist portion of the braking system becomes inoperative. With the brake pedal mounted very near the floor boards of the vehicle in this type of system, adequate leverage for manual or unassisted operation of the brakes is not available.

It is an object of the present invention to provide an improved vehicle braking system which has an actuator adapted to automatically provide a greater mechanical advantage for unpowered operation than that available for powered operation.

It is another object of the present invention to provide an improved lever mechanism for use with vehicle braking systems normally power operated that makes available a greater mechanical advantage for pedal operation during an unpowered condition.

It is still another object of the present invention to provide an improved lever mechanism that is adapted to change the ratio of a lever output relative to lever movement in response to a change in operating condition by a power operated vehicle braking system.

It is a further object of the present invention to provide an improved vehicle braking system actuator means that is responsive to a loss of power in the braking system to provide a higher pedal for unpowered operation thereof.

Further objects and advantages of the present invention will be apparent from the following description, reference being had to the accompanying drawings wherein a preferred embodiment of the present invention is clearly shown.

In the drawings:

FIGURE 1 is an elevational view, partially diagrammatic, illustrating the subject invention in a configuration typical when the vehicle braking system has a power capability;

FIGURE 2 is an elevational view, partially diagrammatic, illustrating the subject invention in a configuration typical when the vehicle braking system has only an unpowered capability.

Referring now to FIGURE 1, a stationary member or bracket 10 is mounted in substantially perpendicular fashion relative to a floor board 12 of a vehicle, not shown. A brake pedal 14 is pivotally supported at point 16 on the bracket 10 and has a foot contact portion 18 disposed near the floor board 12. An arm 20, carried by the brake pedal 14, provides a pivotal mounting for a substantially triangular shaped lever means 22 at point 24.

The lever means 22 is adapted for pivotal movement around the point 24 and is limited at its extremes of movement by resilient stops 26 and 28 coming into contact with sides of the arm 20. An output arm 30 pivotally engages the lever means 22 at point 32 and a brake booster, generally designated by the numeral 34.

The booster 34 supports an hydraulic master cylinder 36 which is pressurizable in a conventional manner to pressurize in turn a series of vehicle wheel brakes 38 through a line 40.

In the preferred embodiment, shown in FIGURE 1, the brake booster 34 is vacuum operated through a line 42 from a vacuum source 44. The vacuum source 44 could be the intake manifold of a vehicle engine or a vacuum pump. A line 46 communicates pressure from the source 44 to a vacuum actuator 48. The vacuum actuator 48 is fastened in any well-known manner to the brake pedal 14 and is arranged to move pivotally therewith. An output member 50 from the vacuum actuator 48 pivotally engages the lever means 22 at point 52.

A spring 54 has one end engaging a pin 56 on the lever means 22 and has an opposite end engaging a pin 58 on the arm 20. The spring 54 thereby biases the lever 22 in a clockwise fashion around its pivotal mounting at point 24. An opposite force provided by the actuator 48 draws the lever means 22 in a counterclockwise manner on its pivotal mounting at point 24. The spring 54 is designed to generate a lesser force than is provided by the actuator 48; therefore, the dominant force is provided by the actuator 48 and the lever means 22 normally rests against the stop 28 when the power booster mechanism is functioning properly.

In operation, a force is put on the foot contact portion or pad 18 by a vehicle operator and a pivotal movement around the point 16 is thereby generated. As the brake pedal 14 is pivoted near the floor board 12, the arm 20, acting as a unit with the seated lever means 22, draws the output arm 30 into the brake booster 34. The brake booster 34 is a conventional vacuum suspended type and a valve, not shown, meters air from the atmosphere into one side of the booster to provide a pressure against the input side of the hydraulic master cylinder 36. The wheel brakes 38 are thereby energized through the line 40 and a braking action results. A typical system of this variety requires very little pedal movement to operate the braking system and, therefore, the brake pedal 14 can be poised very near the floor board 12.

Referring now to FIGURE 2, the brake pedal is illustrated in a raised position relative to the floor board 12 that it would assume when vacuum pressure in the actuator 48 is lost. This situation could be brought about by many malfunctions in the system described, one of which might be a leak in the line 42.

If a vacuum pressure is lost in the actuator 48, the spring 54 becomes the dominant force acting on the lever means 22 and pivots the lever 22 in a clockwise manner around its mounting at point 24. During this movement, the stop 26 engages the end of the arm 20 and the output arm 30 is moved into the position illustrated in FIGURE 2. The output arm 30 is obviously a fixed length and this movement of the arm 30 drives the lever means 22 upward, as viewed in FIGURE 2. The arm 20 follows the lever means 22 and, consequently, the brake pedal 14 is raised further from the floor board 12 than originally positioned. The effective lever arm represented by the pedal 14 acting on the output rod 30 is changed in ratio and the mechanical advantage increase is made possible for operation of the booster 34. It is understood that the booster 34 is a common variety allowing direct force transmission therethrough into the master cylinder when power is lost in the booster.

It is apparent from an examination of FIGURES 1 and 2 that the mechanical advantage available to the brake pedal 14 in its operation is dependent upon the relative distance between the input side of the booster 34 and the point 16 relative to the distance between point 32 and point 16. Viewing FIGURE 2, it becomes apparent that point 32 is nearer to the point 16 than in FIGURE 1, it being understood that point 16 has not moved relative to the input side of the booster 34. Therefore, the ratio effectively acting on the rod 30 has decreased when the pedal is raised and a mechanical advantage increase is experienced.

The exact amount of brake pedal rise needed in a given installation can be provided by the amount of pivotal movement allowed the lever means 22 or by varying the position of point 16, which is the pivotal mounting point of the pedal 14. It is evident that the illustration used in the description of a vacuum operated booster is illustrative in nature and does not restrict the use of the inventive concept employed herein to vacuum systems. Having the lever mechanism and ratio changing mechanism before him, one skilled in the art could easily adapt this system for use with positive pressure boosters, whether air or fluid. The problem of a relatively low mechanical advantage for unpowered operation of power assisted braking systems is most pronounced in an installation involving a vacuum suspended booster mechanism. It is in this type system that virtually no pedal travel is necessary to operate the booster mechanism and, hence, the brake pedal is likely to be positioned in juxtaposition to a floor board of a vehicle. In systems having air operated or hydraulic operated boosters, a lesser amount of brake pedal rise may be desirable.

While the embodiment of the present invention, as herein disclosed, constitutes a preferred form, it is to be understood that other forms might be adopted.

What is claimed is as follows:

1. Lever mechanism for a braking system having a master cylinder comprising: a rigid input member for said master cylinder; a stationary member carried by a vehicle to be braked; actuator means pivotally carried by said stationary member and arranged to place a force on the braking system; a lever pivotally carried by the actuator means and pivoted to said input member and arranged to be pivotable between two extremes of movement on a portion of the actuator means, said lever pivotally engaged by said input member; power operable means carried by said actuator means and arranged to pivot the lever means into one extreme of movement in response to a change of condition in the braking system whereby the actuator means is supported at a different level relative to the floor board of a vehicle to provide a ratio changing device for brake actuation, said lever forming a direct force transmission link between said actuator means and said input member.

2. Lever mechanism for a braking system including a power assist means, said lever mechanism comprising: a stationary member carried by the vehicle in a fixed manner with respect to the floor board in the driving compartment of a vehicle; a brake pedal including an arm extending therefrom and being pivotally supported by the stationary member; power operable means carried by the brake pedal and being responsive to a pressure in the power assist means; a lever pivotally supported by the arm extending from the brake pedal and adapted to be pivotable thereon between two extremes of movement; biasing means urging said lever towards one extreme of movement; said power operable means urging said lever to a second extreme of movement; and a rigid push rod pivoted to said lever for actuating; the vehicle brakes, said lever pivoted by said biasing means in response to a change in pressure in the power assist means to one extreme of movement whereby the brake pedal is pivoted to a higher position than originally positioned relative to the vehicle floor board to gain an increased mechanical advantage for operation of the vehicle brakes under operating conditions when the power assist means is effectively inoperative.

3. Lever mechanism according to claim 2 wherein the power operable means is a vacuum actuator and the biasing means is a spring.

4. Lever mechanism according to claim 3 wherein the vacuum actuator is powered by engine vacuum tapped from the intake manifold of the vehicle engine.

5. Lever mechanism according to claim 2 wherein the power assist means for the braking system is vacuum actuated and is mounted on the input side of an hydraulic master cylinder.

6. Lever mechanism for actuating an hydraulic master cylinder for a vehicle braking system having power assist means, said lever mechanism comprising: a bracket carried by a fixed portion of a vehicle and extending into the driving compartment of a vehicle generally perpendicular to the floor board of the vehicle; a brake pedal pivotally supported on said bracket and having a portion adapted to be engaged by the foot of a vehicle operator at a first level relative to the floor board of the vehicle when the power assist means is operative; lever means pivotally carried by a portion of the brake pedal and having portions engageable in abutting relation therewith between two extremes of pivotal movement; said portions of said lever means having noise dampening positioning means operatively positioning said lever means in said two extremes of pivotal movement, spring means urging said lever means towards a first extreme of pivotal movement; a vacuum actuator carried by the brake pedal and including an output member engaging the lever means to effect a pivotal movement of the lever means toward a second extreme of pivotal movement overcoming the spring means when the power assist means is operative; and a rigid output member having one end pivoted directly to said lever means and having another end arranged to actuate the power assist means of the braking system during an operating condition when the power assist means is operative, said output member being movable to a second position in response to a pivotal movement of the lever means effected by a pressure loss in the power assist means acting through the vacuum actuator and the spring means secured to both said lever means and said pedal remote from the pivotal connection of said lever means whereby the brake pedal is positioned at a second level relative to the floor board of the vehicle wherein a greater mechanical advantage is available for unpowered operation of the braking system.

References Cited

UNITED STATES PATENTS

| | | | |
|---|---|---|---|
| 2,365,960 | 12/1944 | Ingres. | |
| 2,706,020 | 4/1955 | Freers et al. | 188—152 |
| 2,836,265 | 5/1958 | Ingres | 188—152 |
| 2,910,147 | 10/1959 | Fishtahler et al. | 188—152 |

A. HARRY LEVY, *Primary Examiner.*

UNITED STATES PATENT OFFICE
CERTIFICATE OF CORRECTION

Patent No. 3,338,348                        August 29, 1967

Jerry M. Roethlisberger et al.

It is hereby certified that error appears in the above numbered patent requiring correction and that the said Letters Patent should read as corrected below.

Column 2, line 47, for "If a vacuum" read -- If vacuum --; column 3, line 62, for "actuating;" read -- actuating --.

Signed and sealed this 1st day of October 1968.

(SEAL)
Attest:

Edward M. Fletcher, Jr.                          EDWARD J. BRENNER
Attesting Officer                                     Commissioner of Patents